United States Patent
Hwang

(10) Patent No.: US 12,529,938 B2
(45) Date of Patent: Jan. 20, 2026

(54) CAMERA MODULE THAT PERFORMS IMAGE STABILIZATION

(71) Applicant: Samsung Electronics Co., Ltd., Suwon-si (KR)

(72) Inventor: Youngjae Hwang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 395 days.

(21) Appl. No.: 18/114,844

(22) Filed: Feb. 27, 2023

(65) Prior Publication Data

US 2023/0229058 A1   Jul. 20, 2023

Related U.S. Application Data

(63) Continuation of application No. PCT/KR2022/015453, filed on Oct. 13, 2022.

(30) Foreign Application Priority Data

Oct. 22, 2021  (KR) .................. 10-2021-0141903

(51) Int. Cl.
*G03B 5/02* (2021.01)
*G02B 27/64* (2006.01)
(Continued)

(52) U.S. Cl.
CPC ............. *G03B 5/02* (2013.01); *G02B 27/646* (2013.01); *H02K 11/215* (2016.01); *H02K 11/33* (2016.01);
(Continued)

(58) Field of Classification Search
CPC .......... G02B 27/646; G03B 5/00; G03B 5/02
See application file for complete search history.

(56) References Cited

U.S. PATENT DOCUMENTS

| 8,913,139 B2 | 12/2014 | Park et al. |
| 9,134,587 B2 | 9/2015 | Lim et al. |

(Continued)

FOREIGN PATENT DOCUMENTS

| JP | 2011107470 A | 6/2011 |
| JP | 2011118032 A | 6/2011 |

(Continued)

OTHER PUBLICATIONS

English Translation for KR-2011-0030868-A, 8 pages (Year: 2011).*
(Continued)

*Primary Examiner* — Daniel Petkovsek
(74) *Attorney, Agent, or Firm* — CANTOR COLBURN LLP

(57) ABSTRACT

A camera module includes a lens assembly aligned along an optical axis, an optical image stabilization (OIS) carrier coupled to the lens assembly to move the lens assembly on a plane perpendicular to the optical axis, and a housing to accommodate the lens assembly and the OIS carrier. A first OIS magnet and a second OIS magnet are fixed to a first side surface of the OIS carrier, and are arranged side by side on the first side surface along a direction perpendicular to the optical axis. A first OIS coil member and a second OIS coil member face the first OIS magnet and the second OIS magnet, respectively. A first portion of the first OIS magnet is adjacent to the second OIS magnet and a second portion of the second OIS magnet is adjacent to the first OIS magnet.

20 Claims, 9 Drawing Sheets

(51) Int. Cl.
  *H02K 11/215* (2016.01)
  *H02K 11/33* (2016.01)
  *H02K 41/035* (2006.01)
  *H04N 23/68* (2023.01)
  *G03B 13/36* (2021.01)

(52) U.S. Cl.
  CPC ..... *H02K 41/0354* (2013.01); *H04N 23/6812* (2023.01); *H04N 23/687* (2023.01); *G03B 13/36* (2013.01); *G03B 2205/0007* (2013.01); *G03B 2205/0069* (2013.01)

(56) References Cited

U.S. PATENT DOCUMENTS

| | | |
|---|---|---|
| 2014/0072289 A1 | 3/2014 | Lim et al. |
| 2021/0116673 A1 | 4/2021 | Hwang |
| 2021/0116787 A1 | 4/2021 | Hwang |
| 2021/0289111 A1 | 9/2021 | Lim et al. |

FOREIGN PATENT DOCUMENTS

| | | | | |
|---|---|---|---|---|
| JP | 2014089391 A | | 5/2014 | |
| KR | 20110030868 A | * | 3/2011 | ............... G02B 7/04 |
| KR | 101036010 B1 | | 5/2011 | |
| KR | 20130072721 A | | 7/2013 | |
| KR | 20140035672 A | | 3/2014 | |
| KR | 20140076213 A | | 6/2014 | |
| KR | 20160005956 A | | 1/2016 | |
| KR | 20190061439 A | | 6/2019 | |
| KR | 20210045139 A | | 4/2021 | |
| KR | 20210045252 A | | 4/2021 | |
| KR | 20210073325 A | | 6/2021 | |
| KR | 102311694 B1 | | 10/2021 | |
| WO | 2011068085 A1 | | 6/2011 | |

OTHER PUBLICATIONS

International Search Report with Written Opinion for International Application No. PCT/KR2022/015453; Application Filing Date Oct. 13, 2022; Date of Mailing Jan. 27, 2023 (10 pages).
Extended European Search Report corresponding to Application No. 22883869.4-1207; Dated Nov. 14, 2024.

* cited by examiner

CAMERA MODULE THAT PERFORMS IMAGE STABILIZATION

CROSS-REFERENCE TO RELATED APPLICATION(S)

This application is a continuation application, claiming priority under § 365 (c), of International Application No. PCT/KR2022/015453, filed on Oct. 13, 2022, which is based on and claims the benefit of Korean patent application number 10-2021-0141903, filed on Oct. 22, 2021, in the Korean Intellectual Property Office, the disclosures of which are incorporated by reference herein in their entireties.

TECHNICAL FIELD

The disclosure relates to a camera module configured to perform image stabilization.

BACKGROUND ART

Recently, mobile devices have diversified functions, and there have been increasing demands for improvement regarding photograph capture and/or video capture functions using mobile devices. Accordingly, technologies for correcting vibrations of electronic devices during video capture have been developed.

Vibration correcting schemes include optical image stabilization (OIS) and video digital image stabilization (VDIS). According to the OIS, a lens assembly or an image sensor included in a camera module is movably adjusted to alleviate vibrations. According to the VDIS, a mobile device alleviates vibrations through digital processing.

DISCLOSURE

Technical Problem

OIS actuator assemblies (often simply referred to as OIS actuators) include for example, an OIS coil and an OIS magnet, which operate together to provide OIS functions to alleviate vibrations in a camera module. In line with improvement of the performance of camera modules mounted in electronic devices, OIS actuators for providing OIS functions tend to have increased sizes. As a result, the amount of magnetic flux leaked by OIS magnets has been increasing. As the amount of magnetic flux leaked out of a camera module increases, components of the electronic device other than those included in the camera module may be affected electromagnetically. That is, the increased magnetic flux resulting from the increased sizes of OIS actuators increases electromagnetic influences exerted on other components of the camera module such as, for example, components located at the periphery of the camera module.

Technical Solution

A camera module according to an embodiment of the disclosure may include a lens assembly aligned along an optical axis thereof, an optical image stabilization (OIS) carrier coupled to the lens assembly to move the lens assembly on a plane perpendicular to the optical axis, a housing configured to accommodate the lens assembly and the OIS carrier, a first OIS magnet and a second OIS magnet fixed to a first side surface of the OIS carrier, the first OIS magnet and the second OIS magnet being arranged side by side on the first side surface along a direction perpendicular to the optical axis, the first OIS magnet and the second OIS magnet being polarized magnets, a first OIS coil member fixed to the housing to face the first OIS magnet, a second OIS coil member fixed to the housing to face the second OIS magnet, and a position sensor fixed to the housing while being disposed between the first OIS coil member and the second OIS coil member, and configured to measure a position of the lens assembly, wherein a first portion of the first OIS magnet adjacent to the second OIS magnet and a second portion of the second OIS magnet adjacent to the first OIS magnet have an identical polarity.

A camera module according to an embodiment of the disclosure may include a lens assembly aligned along an optical axis thereof, an OIS carrier coupled to the lens assembly to move the lens assembly on a plane perpendicular to the optical axis, a housing configured to accommodate the lens assembly and the OIS carrier, a first OIS magnet and a second OIS magnet fixed to a first side surface of the OIS carrier, the first OIS magnet and the second OIS magnet being arranged side by side on the first side surface along a first axis perpendicular to the optical axis, the first OIS magnet and the second OIS magnet being polarized magnets, a first portion of the first OIS magnet adjacent to the second OIS magnet and a second portion of the second OIS magnet adjacent to the first OIS magnet having an identical polarity, an OIS coil member facing the first OIS magnet and the second OIS magnet, a position sensor fixed to the housing to be adjacent to the OIS coil member, and a driving circuit electrically connected to the OIS coil member and the position sensor. The driving circuit may control a current applied to the OIS coil member to move the lens assembly on the plane perpendicular to the optical axis, and may measure a position of the lens assembly by using the position sensor.

Advantageous Effects

According to various embodiments disclosed herein, the amount of magnetic flux leaked by an OIS magnet may be reduced, thereby reducing the amount of magnetic flux leaked out of a camera module. Therefore, electromagnetic influences exerted on components on the periphery of the camera module by the magnetic flux leaked by the camera module may be reduced.

In addition, according to an embodiment of the disclosure, the thickness of an OIS actuator (for example, OIS coil and OIS magnet) disposed in a camera module may be reduced. If the thickness of the OIS actuator is reduced, the size of the camera module, for example, the length of the camera module in a direction (x-axis, y-axis) perpendicular to the optical axis (z-axis) may be reduced.

Advantageous effects obtainable from the disclosure are not limited to the above-mentioned advantageous effects, and other advantageous effects not mentioned herein will be clearly understood by those skilled in the art to which the disclosure pertains.

DESCRIPTION OF DRAWINGS

In connection with the description of the drawings, the same or similar reference numerals may be used for the same or similar components.

MODE FOR INVENTION

Hereinafter, various embodiments of the disclosure will be described with reference to the accompanying drawings. However, this is not intended to limit the disclosure to specific embodiments, and this should be understood that various modifications, equivalents, and/or alternatives of the embodiments of the disclosure are included in the disclosure.

Figure 1:
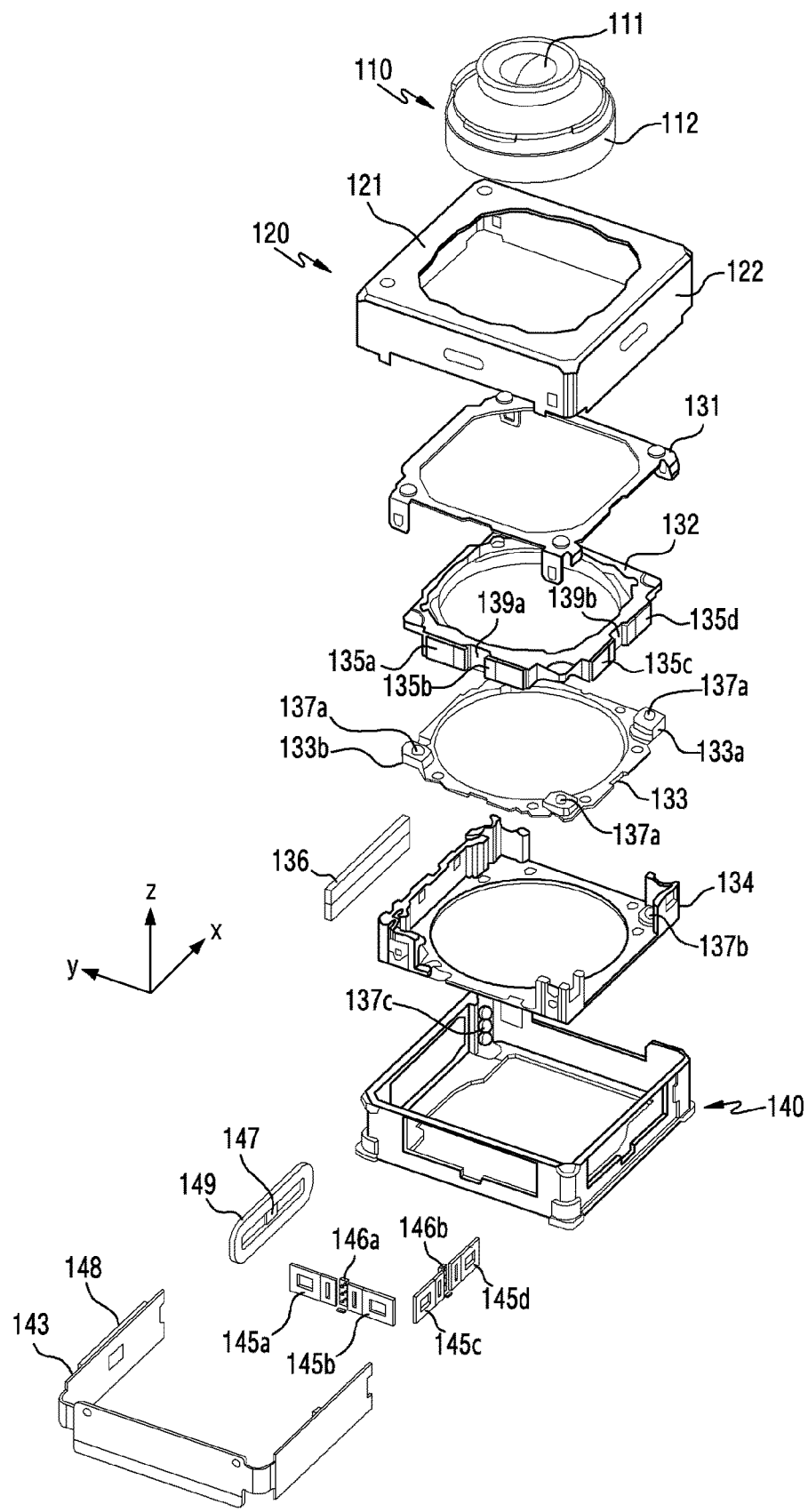
FIG. 1 is an exploded perspective view of a camera module according to one embodiment.
Figure 2:
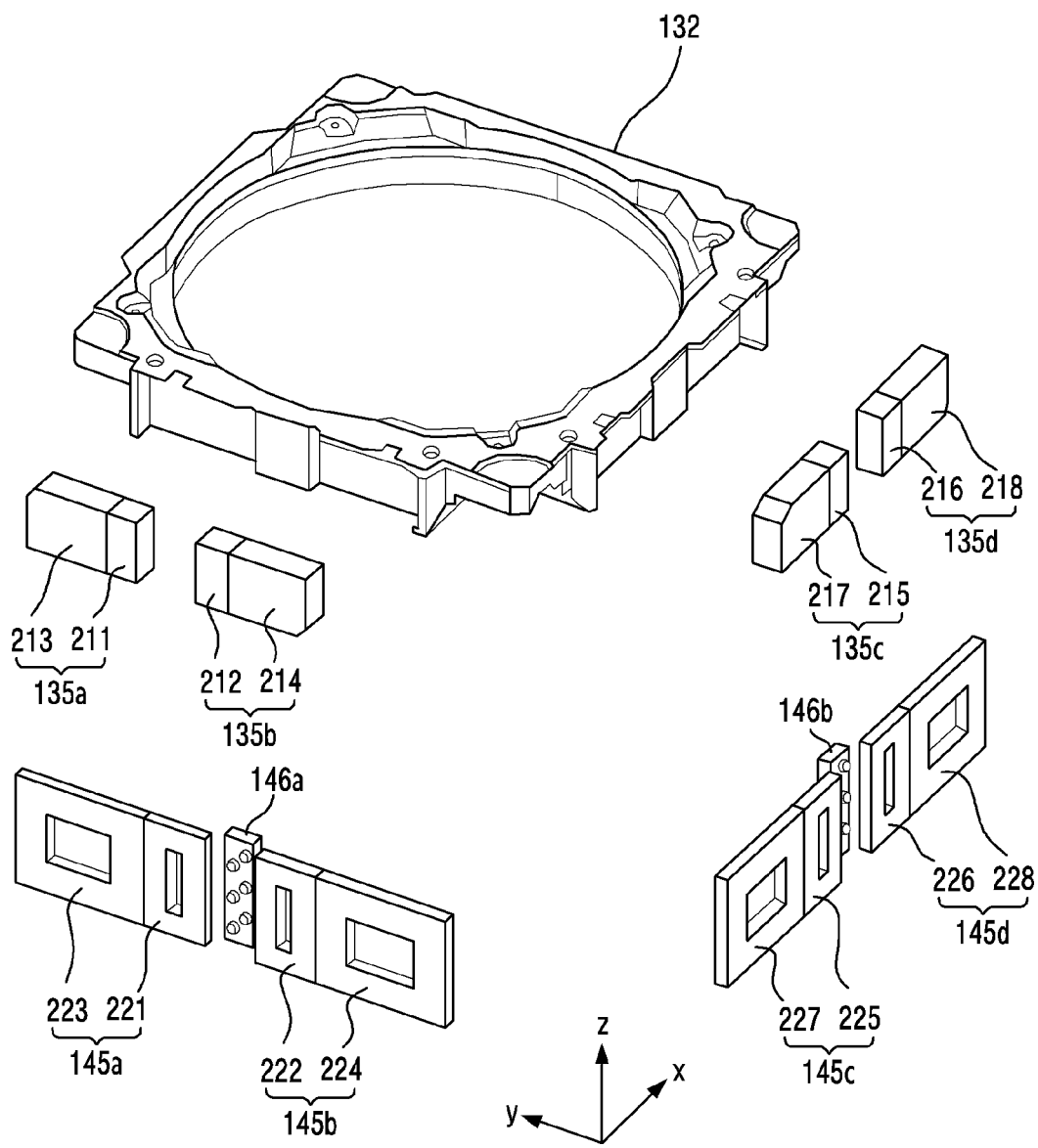
FIG. 2 is a part of an exploded perspective view of a camera module according to one embodiment.
Figure 3:
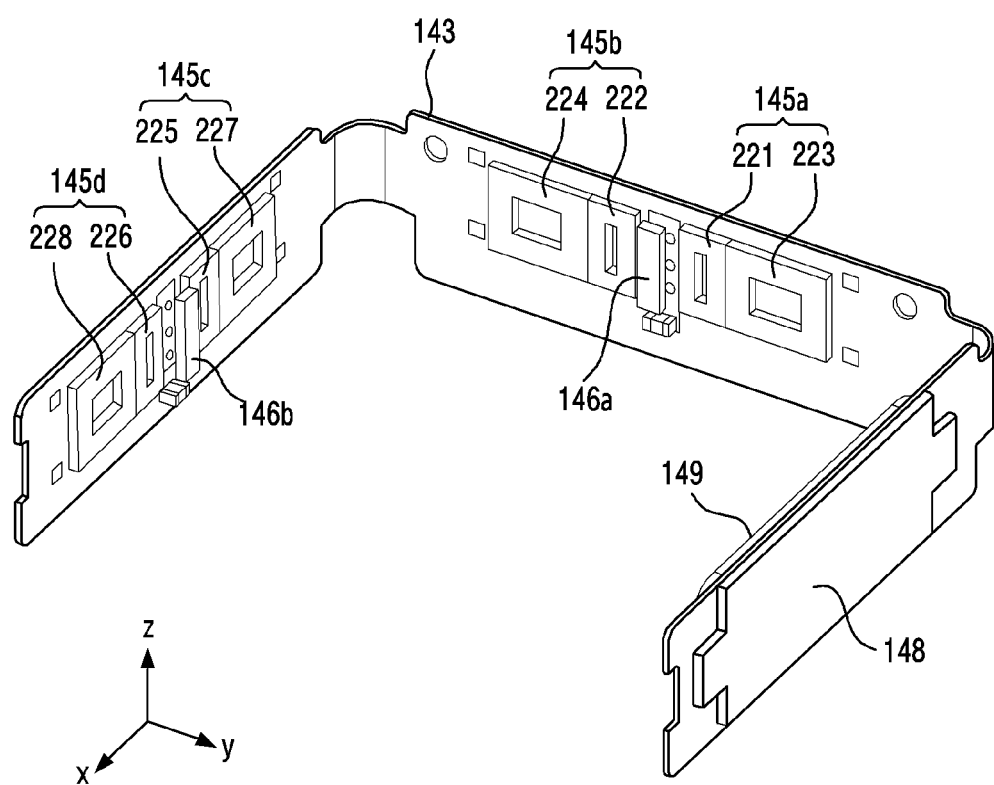
FIG. 3 illustrates positions of an OIS coil and a position sensor of a camera module according to one embodiment.
Figure 4:
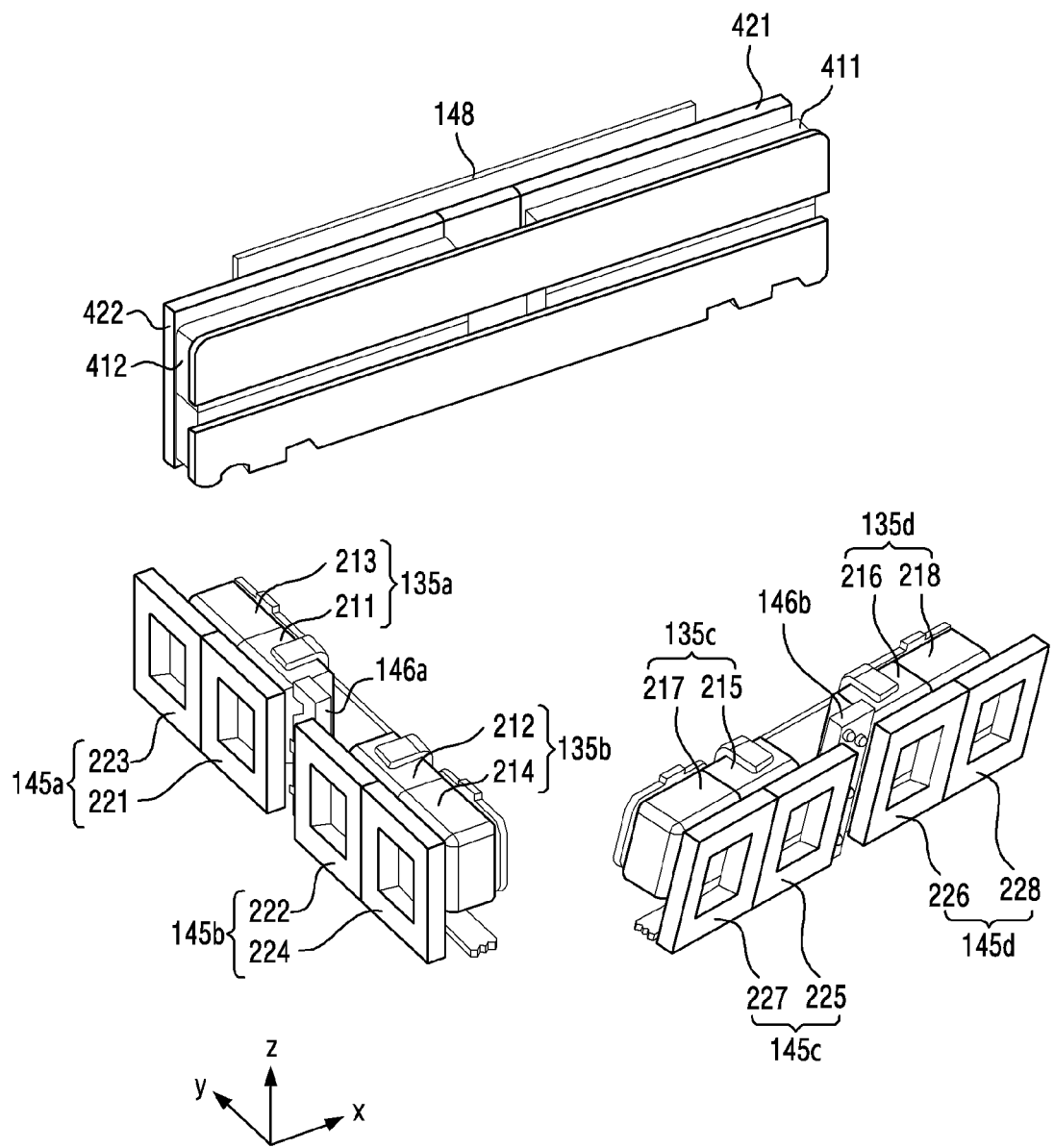
FIG. 4 is a part of an exploded perspective view of a camera module according to one embodiment.
Figure 5:
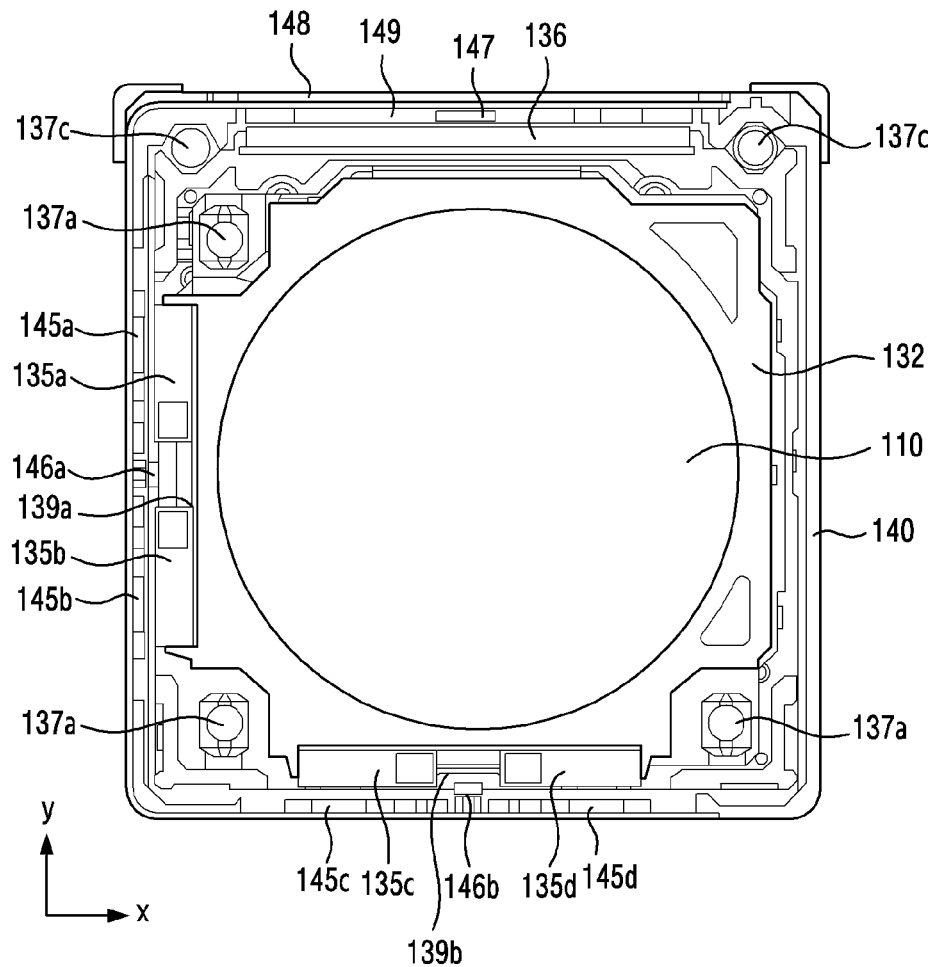
FIG. 5 is a cross-sectional view of a camera module according to one embodiment.

FIG. 1 is an exploded perspective view of a camera module according to one embodiment. FIG. 2 is a part of an exploded perspective view of a camera module according to one embodiment. FIG. 3 illustrates positions of an OIS coil and a position sensor of a camera module according to one embodiment. FIG. 4 is a part of an exploded perspective view of a camera module according to one embodiment. FIG. 5 is a cross-sectional view of a camera module according to one embodiment.

Referring to FIGS. 1 to 5, a camera module (e.g., the camera module 880 of FIGS. 8 and 9) may include a lens assembly 110, an optical image stabilization (OIS) carrier 132, and a housing 140. In one embodiment, the camera module may further include a shield can 120, and an AF carrier 134.

According to one embodiment, the housing 140 includes first and second opposing sides extending along a first axis (e.g. an x-axis) to define first and second side surfaces, respectively, and third and fourth opposing sides extending along a second axis (e.g., a y-axis) perpendicular, or substantially perpendicular, with respect to the first axis to define third and fourth side surfaces, respectively. The camera module may include a lens assembly 110 aligned along an optical axis (e.g., the z-axis) thereof, which is perpendicular, or substantially perpendicular, with respect to the first and second axes. The lens assembly 110 may include a lens 111 and a lens barrel 112. For example, the lens 111 may collect light incident from the outside and transmit the light to an image sensor (not shown) disposed under the lens barrel 112. The lens 111 may include one lens or a plurality of lenses aligned along the optical axis. The lens 111 may be fixed to one side of the lens barrel 112. The lens barrel 112 may surround the lens 111 to be seated therein to fix and support the lens 111. The lens barrel 112 may provide an optical path capable of transmitting light incident along the optical axis (e.g., the z-axis) through the lens 111 to the image sensor disposed in the −z-direction of the lens assembly 110. In this regard, the central portion of the lens barrel 112 may be empty, and the lower portion of the lens barrel 112 may be opened to expose the image sensor. The upper side of the lens barrel 112 may be provided in a shape corresponding to the shape of the lens 111. The lens barrel 112 may be seated and fixed inside an OIS carrier 132. The lens assembly 110 (e.g., the lens barrel 112 and the lens 111) may move on a plane substantially perpendicular to the optical axis or move along the optical axis, according to the movement of the OIS carrier 132 or the AF carrier 134.

According to one embodiment, the shield can 120, as a whole, may cover the camera module from the top (e.g., the +z direction) to the bottom (e.g., the −z direction). For example, the shield can 120 may include an upper surface 121 and shield can sidewalls 122 disposed on edges of the upper surface 121, and the lower surface thereof may be opened. An opening having a predetermined size may be provided on the upper surface 121 of the shield can 120 to expose at least a portion of the lens 111. The shield can sidewalls 122 may be coupled to the edges of the housing 140 of the camera module to serve to protect or fix components (e.g., the lens assembly 110, the OIS carrier 132, the AF carrier 134, and the housing 140) seated inside the housing 140. The shield can 120 may be formed of, for example, a metal material or a material having a designated hardness or greater (e.g., a metal material or reinforced plastic).

According to one embodiment, the camera module may include an optical image stabilizer (OIS) carrier 132 and an auto focusing (AF) carrier 134. For example, the lens barrel 112 may be disposed inside the OIS carrier 132. In one embodiment, the lens assembly 110 may be coupled to the OIS carrier 132 to move along therewith. For example, the OIS carrier 132 may move within the AF carrier 134 in a direction (e.g., along the x-axis direction or the y-axis direction) substantially perpendicular to the optical axis (e.g., the z-axis). According to one embodiment, the OIS carrier 132 may be coupled to the lens assembly 110 to be accommodated in a space 139 inside the AF carrier 134. For example, the OIS carrier 132 may be seated in the central portion of the AF carrier 134.

According to one embodiment, a first OIS magnet 135*a* and a second OIS magnet 135*b* may be disposed on the first side surface (e.g., the outer side surface in the −x direction) of the OIS carrier 132. The first OIS magnet 135*a* and the second OIS magnet 135*b* may be disposed side by side on the first side surface along a direction (e.g., the y-axis direction) substantially perpendicular to the optical axis (e.g., the z-axis). The first OIS magnet 135*a* and the second OIS magnet 135*b* may be polarized magnets, respectively.

According to one embodiment, a third OIS magnet 135*c* and a fourth OIS magnet 135*d* may be disposed on the second side surface (e.g., the outer side surface in the −y direction) of the OIS carrier 132. The first side surface and the second side surface of the OIS carrier 132 may be the outer side surfaces substantially perpendicular to each other. The third OIS magnet 135*c* and the fourth OIS magnet 135*d* may be disposed side by side on the second side surface along a direction (e.g., the x-axis direction) substantially perpendicular to the optical axis (e.g., the z-axis). The third OIS magnet 135*c* and the fourth OIS magnet 135*d* may be polarized magnets, respectively.

According to one embodiment, the AF carrier 134 may include one or more carrier sidewalls. For example, the AF carrier 134 may include a sidewall disposed to expose the first OIS magnet 135*a* and the second OIS magnet 135*b* which operate such that the OIS carrier 132 on which the lens assembly 110 is seated moves in the x-axis direction. In addition, the AF carrier 134 may include a sidewall disposed to expose the third OIS magnet 135*c* and the fourth OIS magnet 135*d* which operate such that the OIS carrier 132 on which the lens assembly 110 is seated moves in the y-axis direction. In addition, the AF carrier 134 may include a sidewall, the AF magnet 136 used to move the lens assembly 110 in the optical axis (e.g., the z-axis) direction being disposed on the outer side of the sidewall.

According to one embodiment, the camera module may include a cover 131 (or an OIS cover). For example, the cover 131 may cover the OIS carrier 132 and the AF carrier 134 from the top to the bottom. The cover 131 may prevent the OIS carrier 132 from being separated from the AF carrier 134. In this regard, the cover 131 may include an upper substrate and leads. The upper substrate of the cover 131 may have a circular or polygonal band (e.g., a rectangular band) shape which has an empty central portion, and include a cover hole formed through a central portion thereof and having a predetermined size such that at least a portion of the lens 111 may be exposed. Each of the leads of the cover 131 may be formed on one side (e.g., a corner region) of the upper substrate and directly extend downward (e.g., the −z direction) to a predetermined length and width. As one embodiment, the leads may have a ring shape with an empty central portion to be coupled to one side of the AF carrier 134.

According to one embodiment, the camera module may include a first OIS coil member 145a fixed to the housing 140 to face the first OIS magnet 135a, a second OIS coil member 145b fixed to the housing 140 to face the second OIS magnet 135b, a third OIS coil member 145c fixed to the housing 140 to face the third OIS magnet 135c, and a fourth OIS coil member 145d fixed to the housing 140 to face the fourth OIS magnet 135d. The first OIS coil member 145a and the second OIS coil member 145b may be fixedly disposed on a first inner surface of the housing 140 facing a first side surface of the OIS carrier 132. The third OIS coil member 145c and the fourth OIS coil member 145d may be fixedly disposed on a second inner surface of the housing 140 facing a second side surface of the OIS carrier 132.

According to one embodiment, the first OIS magnet 135a, the second OIS magnet 135b, the third OIS magnet 135c, and the fourth OIS magnet 135d for hand shake correction (e.g., an optical image stabilizer (OIS)) may be operated in pairs with hand shake correction-related coils (e.g., the first OIS coil member 145a, second OIS coil member 145b, third OIS coil member 145c, and fourth OIS coil member 145d) disposed in the housing 140. For example, when a current is applied to the first OIS coil member 145a, the lens assembly 110 may move along a direction (e.g., the x-axis direction) substantially perpendicular to the optical axis, due to electromagnetic interaction between the first OIS coil member 145a and the first OIS magnet 135a. As another example, when a current is applied to the first OIS coil member 145a and the second OIS coil member 145b, the lens assembly 110 may move along a direction (e.g., the x-axis direction) substantially perpendicular to the optical axis, due to electromagnetic interaction between the first OIS coil member 145a and the first OIS magnet 135a and electromagnetic interaction between the second OIS coil member 145b and the second OIS magnet 135b. As another example, when a current is applied to the third OIS coil member 145c and the fourth OIS coil member 145d, the lens assembly 110 may move along another direction (e.g., the y-axis direction) substantially perpendicular to the optical axis, due to electromagnetic interaction between the third OIS coil member 145c and the third OIS magnet 135c and electromagnetic interaction between the fourth OIS coil member 145d and the fourth OIS magnet 135d.

According to one embodiment, the AF magnet 136 for automatic focus adjustment (e.g., auto focus) may be operated in pairs with the AF coil 149 disposed in the housing 140. For example, when a current is applied to the AF coil 149, the lens assembly 110 may move along a direction (e.g., the +z/z-axis directions) parallel to the optical axis, due to electromagnetic interaction between the AF coil 149 and the AF magnet 136.

According to one embodiment, the camera module may include a first position sensor 146a fixed to the housing 140 while being disposed between the first OIS coil member 145a and the second OIS coil member 145b. In addition, the camera module may include a second position sensor 146b fixed to the housing 140 while being disposed between the third OIS coil member 145c and the fourth OIS coil member 145d. For example, the first position sensor 146a and/or the second position sensor 146b may be hall sensors. According to one embodiment, the camera module (or a driving circuit included in the camera module) may measure the position of the lens assembly 110 by using at least one of the first position sensor 146a and the second position sensor 146b. For example, the camera module may measure the position of the lens assembly 110 on the x-axis (e.g., a distance between the first position sensor 146a and the lens assembly 110) by using the first position sensor 146a, and measure the position of the lens assembly 110 on the y-axis (e.g., a distance between the second position sensor 146b and the lens assembly 110) by using the second position sensor 146b. According to one embodiment, the camera module (e.g., the driving circuit) may identify the position of the OIS magnet, based on the amount of magnetic flux by the OIS magnet (e.g., the first OIS magnet 135a, second OIS magnet 135b, third OIS magnet 135c, fourth OIS magnet 135d) measured through a position sensor (e.g., the first position sensor 146a, second position sensor 146b), and may identify the position of the lens assembly 110, based on the position of the OIS magnet. For example, the position of the lens assembly 110 on the x-axis may be measured based on the flux by the first OIS magnet 135a and the second OIS magnet 135b measured through the first position sensor 146a.

According to one embodiment, the camera module may include an AF position sensor 147 disposed adjacent to the AF coil 149 (e.g., disposed inside the AF coil 149). According to one embodiment, the camera module (or the driving circuit included in the camera module) may measure the position of the lens assembly 110 in the optical axis (e.g., the z-axis) direction by using the AF position sensor 147. For example, the camera module (e.g., the driving circuit) may identify the position of the AF coil 149 on the z-axis, based on the amount of magnetic flux by the AF coil 149 measured through the AF position sensor 147. The camera module (e.g., the driving circuit) may identify the position of the lens assembly 110 in the optical axis direction, based on the position of the AF coil 149 on the z-axis.

According to one embodiment, the thickness of the first position sensor 146a, the second position sensor 146b, and the AF position sensor 147 may be thicker than the thickness of the coils (e.g., the first OIS coil member 145a, the second OIS coil member 145b, the third OIS coil member 145c, the fourth OIS coil member 145d, and the AF coil 149). For example, the thickness of the first OIS coil member 145a and the second OIS coil member 145b may be smaller than the thickness of the first position sensor 146a. In addition, the thickness of the third OIS coil member 145c and the fourth OIS coil member 145d may be smaller than the thickness of the second position sensor 146b. The thickness of the AF coil 149 may be smaller than the thickness of the AF position sensor 147.

According to one embodiment, the first OIS coil member 145a, the second OIS coil member 145b, the third OIS coil member 145c, and the fourth OIS coil member 145d may be fine pattern (FP) coils. For example, the first OIS coil member 145a may be a coil in which patterns corresponding to the first coil 221 and the third coil 223, respectively, are drawn. In addition, the second OIS coil member 145b may be a coil in which patterns corresponding to the second coil 222 and the fourth coil 224, respectively, are drawn. According to one embodiment, the AF coil 149 may be a winding coil.

According to one embodiment, the camera module may include guide balls 137a and 137b and a guide member 133 which are configured to guide and support the movement of the OIS carrier 132. For example, the first guide balls 137a may be disposed between the OIS carrier 132 and the guide member 133. The OIS carrier 132 may move forward and backward in the x-axis direction (or the y-axis direction) through the first guide balls 137a. The second guide balls 137b may be disposed between the guide member 133 and the AF carrier 134. The guide member 133 may move forward and backward in the y-axis direction (or the x-axis direction) through the second guide balls 137b, whereby the OIS carrier 132 may move forward and backward in the y-axis direction (or the x-axis direction). According to one embodiment, guide grooves (e.g., 133a and 133b) in which the guide balls 137a and 137b are accommodated may be provided in the OIS carrier 132, the guide member 133, and the AF carrier 134. The first guide groove 133a may be disposed on a surface of the guide member 133 in the +z-axis direction. The second guide groove 133b may be disposed on a surface of the guide member 133 in the −z-axis direction. For example, the guide grooves (e.g., 133a and 133b) may extend along a designated direction (e.g., the x-axis or y-axis direction), and the cross-section thereof may be a V-shape or a U-shape. The guide grooves (e.g., 133a and 133b) may restrict the OIS carrier 132 from moving in a direction other than a designated direction (e.g., the x-axis or y-axis direction). When the OIS carrier 132 moves forward and backward in the x-axis or y-axis direction, the guide balls 137a and 137b may perform rolling in the guide grooves (e.g., 133a, 133b).

According to one embodiment, at least one sidewall of the AF carrier 134 may be provided with AF guide grooves and AF guide balls 137c configured to guide and support the movement of the AF carrier 134. For example, the AF guide grooves may restrict the AF carrier 134 from moving in a direction other than a designated direction (e.g., the z-axis direction) within the housing 140. The AF guide grooves may extend along a designated direction (e.g., the z-axis direction), and the cross-section thereof may be a V-shape or a U-shape. When the AF carrier 134 moves forward and backward in a designated direction (e.g., the z-axis direction), the AF guide balls 137c may perform rolling in the AF guide grooves.

According to one embodiment, the camera module may include a housing 140 configured to accommodate the lens assembly 110, the OIS carrier 132, and the AF carrier 134. The housing 140 may include at least a seating portion on which the lens assembly 110, the OIS carrier 132, and the AF carrier 134 are seated, and housing sidewalls disposed to surround at least the components. An opening through which the image sensor may be exposed may be formed in the seating portion of the housing 140. The first OIS coil member 145a and the second OIS coil member 145b inter-operating with the first OIS magnet 135a and the second OIS magnet 135b disposed on the OIS carrier 132 such that the lens assembly 110 moves in the x-axis direction may be disposed on a first inner surface among the inner side surfaces of the housing 140. In addition, the third OIS coil member 145c and the fourth OIS coil member 145d inter-operating with the third OIS magnet 135c and the fourth OIS magnet 135d disposed on the OIS carrier 132 such that the lens assembly 110 moves in the y-axis direction may be disposed on a second inner surface among the inner side surfaces of the housing 140. The AF coil 149 that interoperates with the AF magnet 136 disposed such that that the lens assembly 110 moves in the z-axis direction may be disposed on a third inner surface among the inner side surfaces of the housing 140.

According to one embodiment, the AF yoke 148 may be disposed on a surface opposite to a third inner surface on which the AF coil 149 is disposed, among the outer side surfaces of the housing 140. For example, the AF coil 149 may be disposed between the AF magnet 136 and the AF yoke 148. The AF yoke 148 may concentrate the electromagnetic force between the AF magnet 136 and the AF coil 149 to improve the efficiency of the AF coil 149. In addition, the AF carrier 134 may be in close contact with the third inner surface of the housing 140 by the attractive force between the AF magnet 136 and the AF yoke 148. Accordingly, the AF guide balls 137c may not be separated from the AF guide grooves, and the AF carrier 134 may smoothly move forward and backward in the z-axis direction.

According to one embodiment, the sidewalls of the housing 140 may be engaged with the shield can sidewalls 122 and thus protect components (e.g., the lens assembly 110 and the OIS carrier 132) disposed therein.

According to one embodiment, the first position sensor 146a, the second position sensor 146b, and the AF position sensor 147 may be electrically connected to the printed circuit board 143 (e.g., a flexible printed circuit board (FPCB)). According to one embodiment, the first OIS coil member 135a, the second OIS coil member 135b, the third OIS coil member 135c, the fourth OIS coil member 135d, and the AF coil 149 may be electrically connected to the printed circuit board 143. A driving circuit may be further disposed on the printed circuit board 143, and the driving circuit may be electrically connected to at least one of the first OIS coil member 135a, the second OIS coil member 135b, the third OIS coil member 135c, the fourth OIS coil member 135d, the AF coil 149, the first position sensor 146a, the second position sensor 146b, or the AF position sensor 147.

According to one embodiment, the printed circuit board 143 may supply a signal (e.g., a current) to the coils 145a, 145b, 145c, 145d, and 149 disposed in the housing 140. For example, the printed circuit board 143 may be connected to a driving circuit related to driving of a camera module or an application processor (AP) of an electronic device (e.g., the electronic device 801 of FIG. 8) on which the camera module is seated. According to the control of at least one of the driving circuit and the AP, the printed circuit board 143 may supply a signal of a designated size (e.g., a current of a designated size) to one or more coils 145a, 145b, 145c, 145d, and 149 fixed to the housing 140. According to one embodiment, the printed circuit board 143 may receive a sensing value from the position sensors 146a, 146b, 147 disposed in the housing 140 and supply a signal corresponding thereto to each of the coils 145a, 145b, 145c, 145d, and 149.

According to one embodiment, the camera module (e.g., the driving circuit) may move the lens assembly 110 in one or more directions (e.g., the x-axis direction and the y-axis direction) substantially perpendicular to the optical axis (e.g., the z-axis) by controlling a current applied to at least one of the first OIS coil member 135a, the second OIS coil member 135b, the third OIS coil member 135c, and the fourth OIS coil member 135d. In addition, the driving circuit may move the lens assembly 110 along the optical axis (e.g., the z-axis) by controlling a current applied to the AF coil 149. According to one embodiment, the camera module (e.g., the driving circuit) may measure the position of the lens assembly 110 by using one of the first position sensor 146a, the second position sensor 146b, or the AF position sensor 147. The driving circuit may change the signal applied to the coils (e.g., the first OIS coil member 135a, the second OIS coil member 135b, the third OIS coil member 135c, the fourth OIS coil member 135d, and the AF coil 149), based on the obtained information on the position of the lens assembly 110.

Referring to FIGS. 2 and 3, the first OIS magnet 135a and the second OIS magnet 135b may be disposed on the first side surface of the OIS carrier 132. The third OIS magnet 135c and the fourth OIS magnet 135d may be disposed on the second side surface substantially perpendicular to the first side surface of the OIS carrier 132. In addition, the first OIS coil member 145a fixed to face the first OIS magnet 135a, the second OIS coil member 145b fixed to face the second OIS magnet 135b, and the first position sensor 146a disposed between the first OIS coil member 145a and the second OIS coil member 145b may be disposed on the first inner surface of the housing 140 (e.g., the inner side surface of the housing 140 facing the first side surface of the OIS carrier 132). The third OIS coil member 145c fixed to face the third OIS magnet 135c, the third OIS coil member 145d fixed to face the fourth OIS magnet 135d, and the second position sensor 146b disposed between the third OIS coil member 145c and the fourth OIS coil member 145d may be disposed on the second inner surface of the housing 140 (e.g., the inner side surface of the housing 140 facing the second side surface of the OIS carrier 132).

According to one embodiment, the first OIS magnet 135a and the second OIS magnet 135b may be disposed side by side on the first side surface of the OIS carrier 132 along a direction (e.g., the y-axis direction) substantially perpendicular to the optical axis (e.g., the z-axis). According to one embodiment, the first OIS magnet 135a and the second OIS magnet 135b may be polarized magnets. For example, the first OIS magnet 135a and the second OIS magnet 135b may be magnets polarized to include an N pole and an S pole, respectively.

According to one embodiment, the first OIS magnet 135a may include a first portion 211 adjacent to the second OIS magnet 135b, and a third portion 213 other than the first portion 211. In addition, the second OIS magnet 135b may include a second portion 212 adjacent to the first OIS magnet 135a, and a fourth portion 214 other than the second portion 212.

According to one embodiment, the first portion 211 of the first OIS magnet 135a and the second portion 212 of the second OIS magnet 135b may have the same polarity. According to one embodiment, the third portion 213 of the first OIS magnet 135a and the fourth portion 214 of the second OIS magnet 135b may have the same polarity. For example, the first portion 211 of the first OIS magnet 135a and the second portion 212 of the second OIS magnet 135b may be N poles, and the third portion 213 of the first OIS magnet 135a and the fourth portion 214 of the second OIS magnet 135b may be S poles. For another example, the first portion 211 of the first OIS magnet 135a and the second portion 212 of the second OIS magnet 135b may be S poles, and the third portion 213 of the first OIS magnet 135a and the fourth portion 214 of the second OIS magnet 135b may be N poles.

According to one embodiment, when the first OIS magnet 135a and the second OIS magnet 135b are configured of polarized magnets, respectively, the amount of magnetic flux leaking to the outside of the camera module by the OIS magnet may be reduced. Accordingly, the electromagnetic effect of the leakage magnetic flux by the camera module on components around the camera module can be reduced. The effect of reducing the leakage magnetic flux will be described in greater detail below with reference to FIG. 7.

According to one embodiment, a length ratio of the first portion 211 and the third portion 213 of the first OIS magnet 135a and a length ratio of the second portion 212 and the fourth portion 214 of the second OIS magnet 135b may be equal to each other. For example, the longitudinal polarization ratio of the first OIS magnet 135a in the y-axis direction may be N:1, and the longitudinal polarization ratio of the second OIS magnet 135b in the y-axis direction may be 1:N. The description of the first OIS magnet 135a and the second OIS magnet 135b may also be applied to the length ratios of the third OIS magnet 135c and the fourth OIS magnet 135d. The polarization ratios will be described below with reference to FIG. 2 and FIG. 4 by comparison.

According to one embodiment, the first OIS coil member 145a may include a first coil 221 facing the first portion 211 of the first OIS magnet 135a, and a third coil 223 facing the third portion 213 of the first OIS magnet 135a. In addition, the second OIS coil member 145b may include a second coil 222 facing the second portion 212 of the second OIS magnet 135b, and a fourth coil 224 facing the fourth portion 214 of the second OIS magnet 135b.

According to one embodiment, the third OIS magnet 135c and the fourth OIS magnet 135d may be disposed side by side on the second side surface of the OIS carrier 132 in a direction (e.g., the x-axis direction) substantially perpendicular to the optical axis (e.g., the z-axis). According to one embodiment, the third OIS magnet 135c and the fourth OIS magnet 135d may be polarized magnets. For example, the third OIS magnet 135c and the fourth OIS magnet 135d may be magnets polarized to include an N pole and an S pole, respectively.

According to one embodiment, the third OIS magnet 135c may include a fifth portion 215 adjacent to the fourth OIS magnet 135d, and a seventh portion 217 other than the fifth portion 215. In addition, the fourth OIS magnet 135d may include a sixth portion 216 adjacent to the third OIS magnet 135c, and an eighth portion 218 other than the sixth portion 216.

According to one embodiment, the fifth portion 215 of the third OIS magnet 135c and the sixth portion 216 of the fourth OIS magnet 135d may have the same polarity. According to one embodiment, the seventh portion 217 of the third OIS magnet 135c and the eighth portion 218 of the fourth OIS magnet 135d may have the same polarity. For example, the fifth portion 215 of the third OIS magnet 135c and the sixth portion 216 of the fourth OIS magnet 135d may be N poles, and the seventh portion 217 of the third OIS magnet 135c and the eighth portion 218 of the fourth OIS magnet 135d may be S poles. For another example, the fifth portion 215 of the third OIS magnet 135c and the sixth portion 216 of the fourth OIS magnet 135d may be S poles, and the seventh portion 217 of the third OIS magnet 135c and the eighth portion 218 of the fourth OIS magnet 135d may be N poles.

According to one embodiment, when the third OIS magnet 135c and the fourth OIS magnet 135d are configured as polarized magnets, respectively, the amount of magnetic flux leaking to the outside of the camera module by the OIS magnet may be reduced. Accordingly, the electromagnetic effect of the leakage magnetic flux by the camera module on components around the camera module can be reduced. The effect of reducing the leakage magnetic flux will be described later with reference to FIG. 7.

According to one embodiment, the first portion 211 of the first OIS magnet 135a, the second portion 212 of the second OIS magnet 135b, the fifth portion 215 of the third OIS magnet 135c, and the sixth portion 216 of the fourth OIS magnet 135d may have the same polarity. For example, the first portion 211, the second portion 212, the fifth portion 215, and the sixth portion 216 may be N poles, and the third portion 213, the fourth portion 214, the seventh portion 217, and the eighth portion 218 may be S poles (polar arrangement may be {SN-NS}-{SN-NS}). In another example, the first portion 211, the second portion 212, the fifth portion 215, and the sixth portion 216 may be S poles, and the third portion 213, the fourth part 214, the seventh portion 217, and the eighth portion 218 may be N poles (polar arrangement may be {NS-SN}-{NS-SN}).

According to one embodiment, the first portion 211 of the first OIS magnet 135a and the second portion 212 of the second OIS magnet 135b may have a first polarity, and the fifth portion 215 of the third OIS magnet 135c and the sixth portion 216 of the fourth OIS magnet 135d may have a second polarity. For example, the first portion 211, the second portion 212, the seventh portion 217, and the eighth portion 218 may be N poles, and the third portion 213, the fourth portion 214, the fifth portion 215, and the sixth portion 216 may be S poles (polarity arrangement may be {SN-NS}-{NS-SN}). In another example, the first portion 211, the second portion 212, the seventh portion 217, and the eighth portion 218 may be S poles, and the third portion 213, the fourth portion 214, the fifth portion 215, and the sixth portion 216 may be N poles (polar arrangement may be {NS-SN}-{SN-NS}).

According to one embodiment, compared to the case where the polarity arrangement of the first OIS magnet 135a and the second OIS magnet 135b and the polarity arrangement of the third OIS magnet 135c and the fourth OIS magnet 135d are the same (e.g., {SN-NS}-{SN-NS}, or {NS-SN}-{NS-SN}), when the polarity arrangement of the first OIS magnet 135a and the second OIS magnet 135b and the polarity arrangement of the third OIS magnet 135c and the fourth OIS magnet 135d are different from each other (e.g., {SN-NS}-{NS-SN}, or {NS-SN}-{SN-NS}), the magnetic flux leaking to the outside of the camera module may be further reduced by the OIS magnet.

According to one embodiment, the third OIS coil member 145c may include a fifth coil 225 facing the fifth portion 215 of the third OIS magnet 135c, and a seventh coil 227 facing the seventh portion 217 of the third OIS magnet 135c. In addition, the fourth OIS coil member 145d may include a sixth coil 226 facing the sixth portion 216 of the fourth OIS magnet 135d, and an eighth coil 228 facing the eighth portion 218 of the fourth OIS magnet 135d.

Referring to FIGS. 2 and 4 by comparison, the longitudinal polarization ratio of the OIS magnets 135a, 135b, 135c, and 135d may be formed variously. For example, the length ratio of the first portion 211 and the third portion 213 of the first OIS magnet 135a may be 1:3 as shown in FIG. 2 and be 1:1 as shown in FIG. 4. However, the length ratio is an example, and the length ratio of the first portion 211 and the third portion 213 of the first OIS magnet 135a may be formed variously. According to one embodiment, the description that the length ratio of the first portion 211 and the third portion 213 of the first OIS magnet 135a may be formed variously may be applied to the second OIS magnet 135b, the third OIS magnet 135c, and the fourth OIS magnet 136d. However, the length ratio of the N pole and the S pole included in the first OIS magnet 135a and the length ratio of the N pole and the S pole included in the second OIS magnet 135b may correspond to each other, and the length ratio of the N pole and the S pole included in the third OIS magnet 135c and the length ratio of the N pole and the S pole included in the fourth OIS magnet 135d may correspond to each other. For example, the first OIS magnet 135a and the second OIS magnet 135b disposed on both sides of the first position sensor 146a may have the same polarization ratio (e.g., the first portion 211:the third portion 213=the second portion 212:the fourth portion 214=1:N).

According to one embodiment, when the length ratio of the first portion 211 and the third portion 213 of the first OIS magnet 135a is 1:M (wherein M is a natural number equal to or greater than 2), the magnetic flux due to a respective OIS magnet may increase, compared to the case where the length ratio is 1:1. For example, when the polarization ratio of the OIS magnet is 1:1 as shown in FIG. 4, the amount of magnetic flux by the OIS magnet may be greatly reduced. For another example, when the polarization ratio of the OIS magnet is 1:3 as shown in FIG. 2, the amount of magnetic flux by the OIS magnet may partially increase compared to the embodiment of FIG. 4, and thus the attraction force between the OIS yoke (not shown) and the OIS magnet may increase. That is, compared to the case where the polarization ratio of the OIS magnet is 1:1, when the polarization ratio is 1:3 (or 1:2, 1:1.5, etc.), the magnetic flux leaking to the outside of the camera module may be negligibly small, but the attraction force between the OIS yoke and the OIS magnet may be sufficiently secured so that the OIS carrier 132 may be fixed in the −z direction in the AF carrier 134.

According to an embodiment, a polarization ratio of the OIS magnets (e.g., 135a, 135b, 135c, and 135d) may correspond to a length ratio of coils included in the OIS coil member (e.g., 145a, 145b, 145c, and 145d). For example, referring to FIGS. 2 and 4, the length ratio of the first portion 211 and the third portion 213 of the first OIS magnet 135a in the y-axis direction may correspond to the length ratio of the first coil 221 and the third coil 223 in the y-axis direction included in the first OIS coil member 145a. As another example, even if the length ratio of the first coil 221 and the third coil 223 in the y-axis direction and the length ratio of the first portion 211 and the third portion 213 are different from each other, the first coil 221 may face the first portion 211 and the third coil 223 may face the third portion 213. That is, the OIS coils (e.g., 221, 222, 223, 224, 225, 226, 227, and 228) respectively included in the OIS coil members (e.g., 145a, 145b, 145c, and 145d) may be determined according to a polarized state of the OIS magnets (e.g., 135a, 135b, 135c, and 135d).

According to one embodiment, although the first OIS coil member 145a and the second OIS coil member 145b are illustrated as separate coil members in FIGS. 1 to 5, the camera module may also include an OIS coil member including, for example, the first OIS coil member 145a and the second OIS coil member 145b. For example, the one OIS coil member may include the first coil 221, the second coil 222, the third coil 223, and the fourth coil 224. The above description of the single coil member may also be applied to the third OIS coil member 145c and the fourth OIS coil member 145d.

Referring to FIG. 4, the camera module may also include another type of AF coils 421 and 422 and AF magnets 411 and 412 rather than the AF coils 149 and the AF magnets 136 illustrated in FIGS. 1 to 3 and 5. For example, the camera module may include two AF magnets 411 and 412 arranged side by side on one side surface (e.g., the +y direction) of the outer side surfaces of the AF carrier 134 along a direction (e.g., the x-axis direction) substantially perpendicular to the optical axis (e.g., z-axis). In addition, the camera module may also include two AF coils 421 and 422 fixed to the housing 140 to face the two AF magnets 411 and 412, respectively. The descriptions of the AF magnets 136 and the AF coil 149, except for the description of the arrangement or the number thereof, may be applied to the AF magnets 411 and 412 and the AF coils 421 and 422.

Referring to FIGS. 1 to 5, the first position sensor 146a may be disposed on the inner side surface of the housing 140 to at least partially overlap a space 139a between the first OIS magnet 135a and the second OIS magnet 135b. In addition, the second position sensor 146b may be disposed on the inner side surface of the housing 140 to at least partially overlap a space 139b between the third OIS magnet 135c and the fourth OIS magnet 135d. For example, the first position sensor 146a may partially overlap with a region formed by virtually expanding the first OIS magnet 135a and the second OIS magnet 135b along the y-axis. In addition, the second position sensor 146b may partially overlap a region formed by virtually expanding the third OIS magnet 135c and the fourth OIS magnet 135d along the x-axis.

According to one embodiment, when two OIS magnets (e.g., the first OIS magnet 135a and the second OIS magnet 135b rather than one OIS magnet are disposed on the outer side surface (e.g., the first side surface) of the OIS carrier 132, and a position sensor (e.g., the first position sensor 146a) is fixed to the housing 140 to partially overlap the space 139 between the two OIS magnets, the size (e.g., the width in the x-axis direction) of the camera module can be reduced. For example, an OIS actuator (e.g., an OIS coil, an OIS magnet, and an OIS position sensor) may be disposed on the side surface of the OIS carrier 132 in the +x direction or on the side surface of the OIS carrier 132 in the −x direction to perform OIS for moving the lens assembly 110 in the x-axis direction. Accordingly, as in the disclosure, when an OIS magnet is separated into two independent OIS magnets (e.g., 135a and 135b) and the OIS position sensor (e.g., 146a) is positioned in the space 139 between the two OIS magnets, the thickness (e.g., the thickness in the x-axis direction) of the OIS actuator can be reduced. Therefore, according to an embodiment of the disclosure, the thickness of the OIS actuator (e.g., the OIS coil and the OIS magnet) disposed in the camera module can be reduced. When the thickness of the OIS actuator is reduced, the size of the camera module, for example, the length of the camera module in a direction (the x-axis and the y-axis) substantially perpendicular to the optical axis (the z-axis) may decrease.

Figure 6:
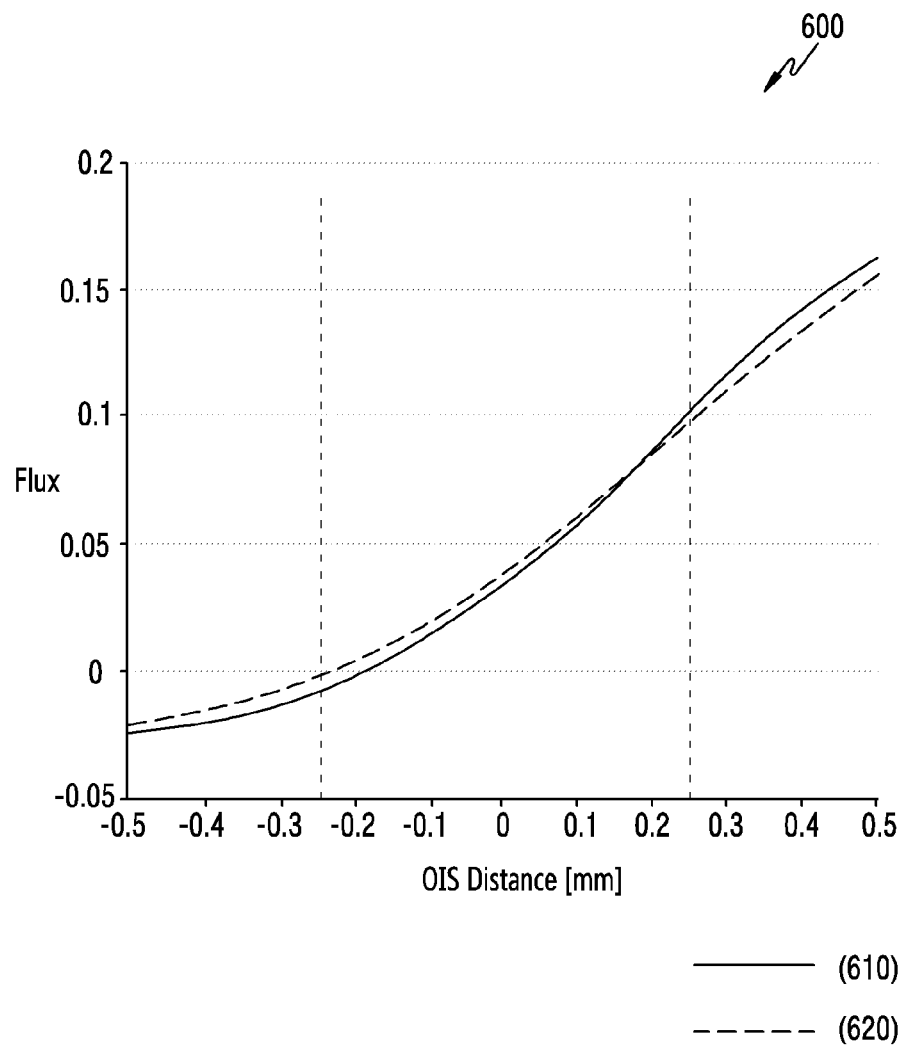
FIG. 6 illustrates an example of a method in which a camera module measures a position of a lens assembly through a position sensor according to one embodiment.

FIG. 6 illustrates an example of a method in which a camera module measures a position of a lens assembly through a position sensor according to one embodiment.

According to one embodiment, the graph 600 shows magnetic flux detected by a OIS position sensor (e.g., the first position sensor 146a and the second position sensor 146b) according to positions of the lens assembly 110. For example, the graph 600 shows the magnetic flux detected by the first position sensor 146a according to the movement of the lens assembly 110 along the x-axis. The OIS distance on the horizontal axis in the graph 600 refers to a position of the lens assembly 110 which has moved on the x-axis according to the x-axis OIS performed using the first OIS coil member 145a and the second OIS coil member 145b. For example, the OIS distance, 0, indicates a position of the lens assembly 110 in a state where the x-axis OIS has not been performed.

According to one embodiment, reference number 610 indicates the magnetic flux by the first OIS magnet 135a and the second OIS magnet 135b detected by the first position sensor 146a when the OIS driving is performed in the x-axis direction in a state where the lens assembly 110 have not moved in the y-axis direction. Reference numeral 620 indicates the magnetic flux by the first OIS magnet 135a and the second OIS magnet 135b sensed by the first position sensor 146a when the OIS driving is performed in the x-axis direction in a state where the lens assembly 110 is shifted a predetermined distance in the y-axis direction.

Referring to FIG. 6, the change amount of the magnetic flux by the first OIS magnet 135a and the second OIS magnet 135b, which is detected through magnetic flux (e.g., the first OIS position sensor 146a) according to the OIS distance (or a position of the lens assembly 110) forms substantially a linear graph. According to one embodiment, when the first portion 211 of the first OIS magnet 135a and the second portion 212 of the second OIS magnet 135b have a first polarity, and the third portion 213 of the first OIS magnet 135a and the fourth portion 214 of the second OIS magnet 135b have a second polarity, the magnetic flux detected by the first position sensor 146a may form a linear graph as shown in the graph 600. In addition, not only when the lens assembly 110 does not move in the y-axis direction but moves only in the x-axis (e.g., 610) but also when the lens assembly 110 moves in the x-axis in a state where the lens assembly 110 has partially moved in the y-axis direction (e.g., 620), the magnetic flux detected by the first position sensor 146a may form a linear graph.

According to one embodiment, when the magnetic flux change amount according to the OIS distance detected by the first position sensor 146a forms a linear graph, the driving circuit may identify the OIS distance (or the position of the lens assembly 110 on the x-axis), based on the detected magnetic flux.

Figure 7:
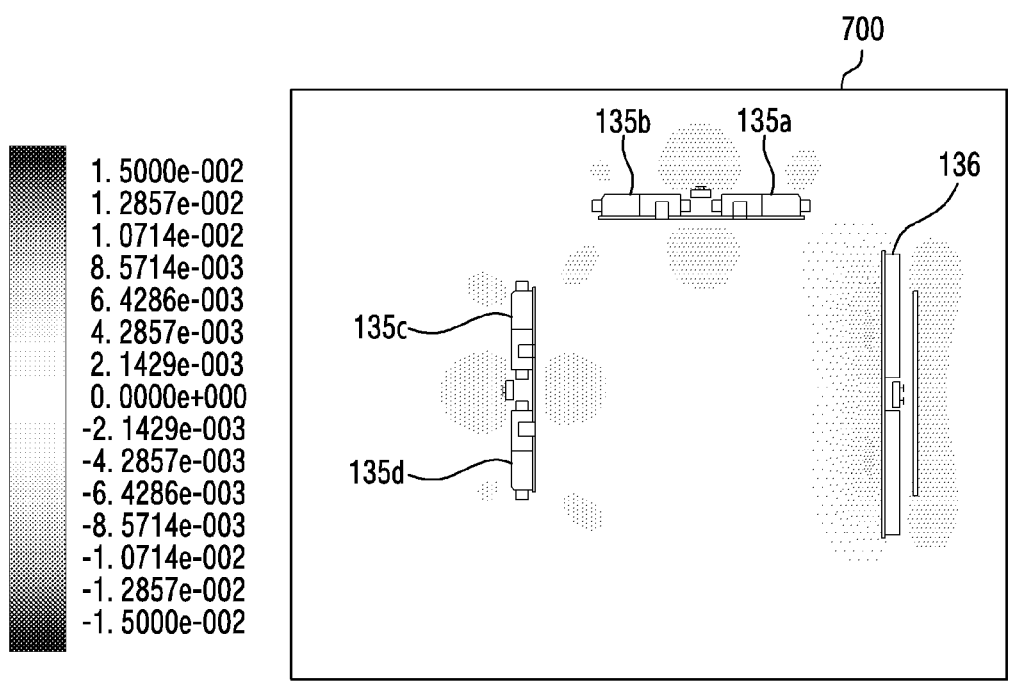
FIG. 7 is a graph showing an amount of magnetic flux leaking by a camera module according to one embodiment.

FIG. 7 is a graph showing an amount of magnetic flux leaking by a camera module according to one embodiment.

Referring to FIG. 7, the graph 700 shows the magnetic flux by the first OIS magnet 135a, the second OIS magnet 135b, the third OIS magnet 135c, the fourth OIS magnet 135d, and the AF magnet 136. According to one embodiment, the leakage magnetic flux amount may decrease in the camera module including the polarized first OIS magnet 135a, second OIS magnet 135b, third OIS magnet 135c, and fourth OIS magnet 135d. For example, unlike the disclosure, in the case of a camera module including OIS magnets (e.g., the first OIS magnet, the second OIS magnet, the third OIS magnet, and the fourth OIS magnet) which are formed of non-polarized magnets, the magnetic flux leaking to the outside of the camera module may increase, which may have an electromagnetic effect on peripheral components of the camera module. According to another example, in a case, unlike as described in the disclosure, where a camera module has OIS magnets, some magnets (e.g., the first OIS magnet, and the third OIS magnet) of which have a first polarity, and the remaining magnets (e.g., the second OIS magnet, and the fourth OIS magnet) of which have a second polarity, it may be difficult to perform OIS driving because a linear graph is not formed as shown in FIG. 6 even if the amount of the magnetic flux leaking to the outside of the camera module is not much.

As described in the disclosure, however, in the case of a camera module in which the first OIS magnet 135*a*, the second OIS magnet 135*b*, the third OIS magnet 135*c*, and the fourth OIS magnet 135*d* are polarized magnets, respectively, the first OIS magnet 135*a* and the second OIS magnet 135*b* have polarization symmetrical to each other, and the third OIS magnet 135*c* and the fourth OIS magnet 135*d* also have polarization symmetrical to each other, the amount of leakage magnetic flux may decrease and a linear graph may be formed as shown in FIG. 6. Therefore, according to various embodiments disclosed in the present disclosure, the amount of magnetic flux leakage due to the OIS magnet may be reduced, so that the amount of magnetic flux leaking to the outside of the camera module may be reduced. Accordingly, the electromagnetic effect of the leakage magnetic flux by the camera module on components around the camera module can be reduced.

Figure 8:
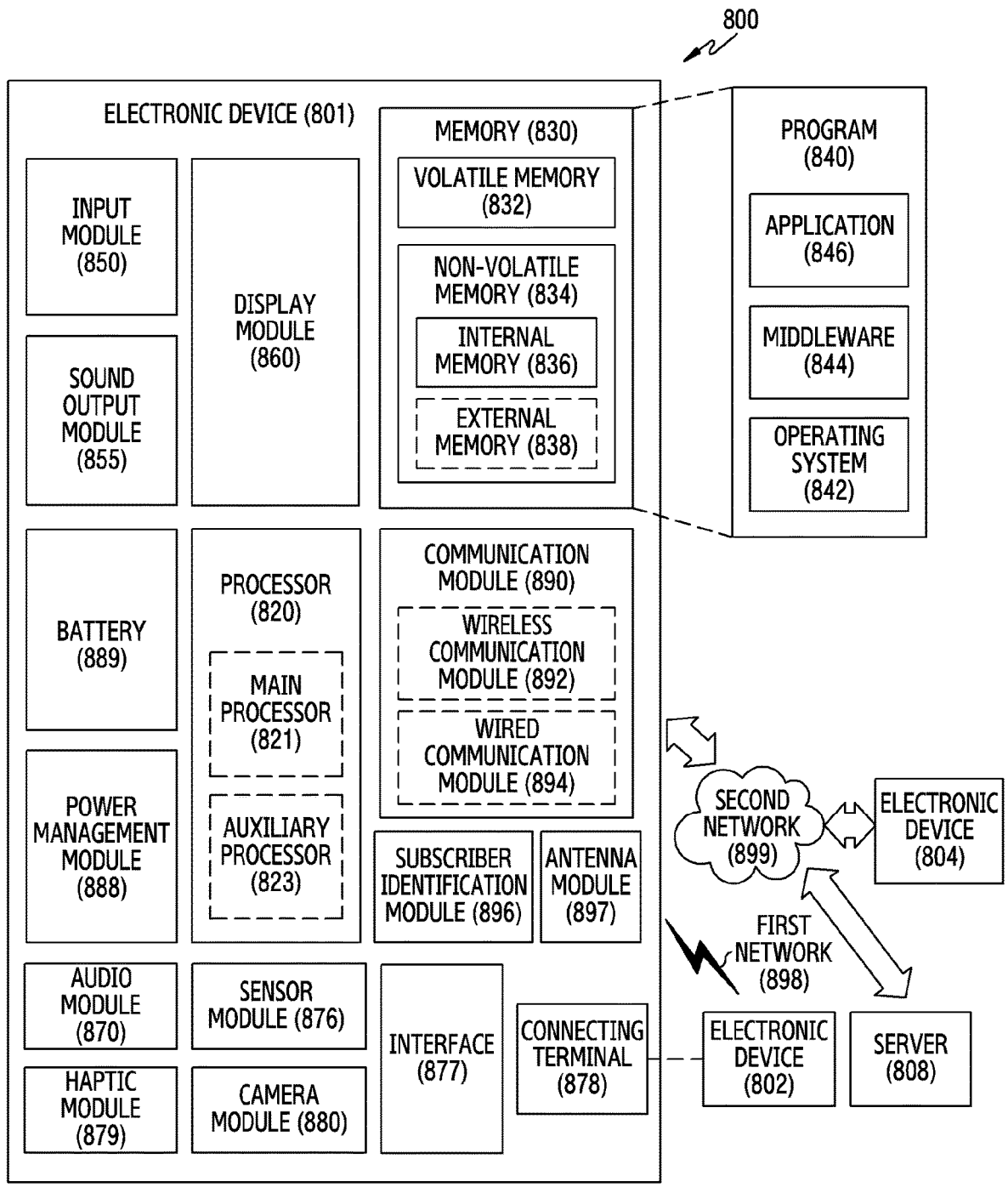
FIG. 8 is a block diagram of an electronic device in a network environment according to various embodiments.

FIG. 8 is a block diagram of an electronic device in a network environment according to various embodiments. Referring to FIG. 8, the electronic device 801 in the network environment 800 may communicate with an electronic device 802 via a first network 898 (e.g., a short-range wireless communication network), or at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display module 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™ wireless-fidelity (Wi-Fi) direct, or infrared data association (IrDA)) or the second network 899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the mmWave band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

According to various embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 9:
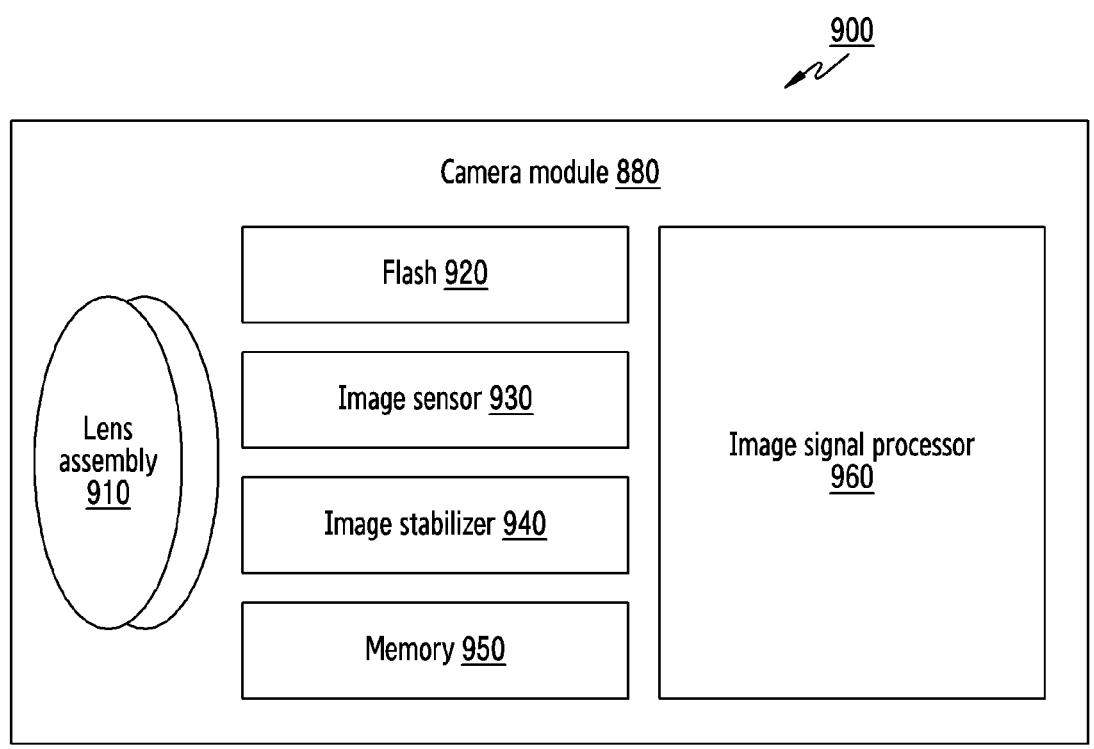
FIG. 9 is a block diagram showing a camera module according to various embodiments.

FIG. 9 is a block diagram showing a camera module according to various embodiments. Referring to FIG. 9, the camera module 880 may include a lens assembly 910, a flash 920, an image sensor 930, an image stabilizer 940, memory 950 (e.g., buffer memory), or an image signal processor 960. The lens assembly 910 may collect light emitted or reflected from an object whose image is to be taken. The lens assembly 910 may include one or more lenses. According to an embodiment, the camera module 880 may include a plurality of lens assemblies 910. In such a case, the camera module 880 may form, for example, a dual camera, a 360-degree camera, or a spherical camera. Some of the plurality of lens assemblies 910 may have the same lens attribute (e.g., view angle, focal length, auto-focusing, f number, or optical zoom), or at least one lens assembly may have one or more lens attributes different from those of another lens assembly. The lens assembly 910 may include, for example, a wide-angle lens or a telephoto lens.

The flash 920 may emit light that is used to reinforce light reflected from an object. According to an embodiment, the flash 920 may include one or more light emitting diodes (LEDs) (e.g., a red-green-blue (RGB) LED, a white LED, an infrared (IR) LED, or an ultraviolet (UV) LED) or a xenon lamp. The image sensor 930 may obtain an image corresponding to an object by converting light emitted or reflected from the object and transmitted via the lens assembly 910 into an electrical signal. According to an embodiment, the image sensor 930 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 930 may be implemented using, for example, a charged coupled device (CCD) sensor or a complementary metal oxide semiconductor (CMOS) sensor.

The image stabilizer 940 may move the image sensor 930 or at least one lens included in the lens assembly 910 in a particular direction, or control an operational attribute (e.g., adjust the read-out timing) of the image sensor 930 in response to the movement of the camera module 880 or the electronic device 801 including the camera module 880. This allows compensating for at least part of a negative effect (e.g., image blurring) by the movement on an image being captured. According to an embodiment, the image stabilizer 940 may sense such a movement by the camera module 880 or the electronic device 801 using a gyro sensor (not shown) or an acceleration sensor (not shown) disposed inside or outside the camera module 880. According to an embodiment, the image stabilizer 940 may be implemented, for example, as an optical image stabilizer. The memory 950 may store, at least temporarily, at least part of an image obtained via the image sensor 930 for a subsequent image processing task. For example, if image capturing is delayed due to shutter lag or multiple images are quickly captured, a raw image obtained (e.g., a Bayer-patterned image, a high-resolution image) may be stored in the memory 950, and its corresponding copy image (e.g., a low-resolution image) may be previewed via the display module 860. Thereafter, if a specified condition is met (e.g., by a user's input or system command), at least part of the raw image stored in the memory 950 may be obtained and processed, for example, by the image signal processor 960. According to an embodiment, the memory 950 may be configured as at least part of the memory 830 or as a separate memory that is operated independently from the memory 830.

The image signal processor 960 may perform one or more image processing with respect to an image obtained via the image sensor 930 or an image stored in the memory 950. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 960 may perform control (e.g., exposure time control or read-out timing control) with respect to at least one (e.g., the image sensor 930) of the components included in the camera module 880. An image processed by the image signal processor 960 may be stored back in the memory 950 for further processing, or may be provided to an external component (e.g., the memory 830, the display module 860, the electronic device 802, the electronic device 804, or the server 808) outside the camera module 880. According to an embodiment, the image signal processor 960 may be configured as at least part of the processor 820, or as a separate processor that is operated independently from the processor 820. If the image signal processor 960 is configured as a separate processor from the processor 820, at least one image processed by the image signal processor 960 may be displayed, by the processor 820, via the display module 860 as it is or after being further processed.

According to an embodiment, the electronic device 801 may include a plurality of camera modules 880 having different attributes or functions. In such a case, at least one of the plurality of camera modules 880 may form, for example, a wide-angle camera and at least another of the plurality of camera modules 880 may form a telephoto camera. Similarly, at least one of the plurality of camera modules 880 may form, for example, a front camera and at least another of the plurality of camera modules 880 may form a rear camera.

A camera module according to one embodiment may include a lens assembly 110 aligned along an optical axis thereof, an optical image stabilization (OIS) carrier 132 coupled to the lens assembly to move the lens assembly on a plane perpendicular to the optical axis, a housing 140 configured to accommodate the lens assembly and the OIS carrier, a first OIS magnet 135*a* and a second OIS magnet 135*b* fixed to a first side surface of the OIS carrier, the first OIS magnet and the second OIS magnet being arranged side by side on the first side surface along a direction perpendicular to the optical axis, the first OIS magnet and the second OIS magnet being polarized magnets, a first OIS coil member 145*a* fixed to the housing to face the first OIS magnet, a second OIS coil member 145*b* fixed to the housing to face the second OIS magnet, and a position sensor 146*a* fixed to the housing while being disposed between the first OIS coil member and the second OIS coil member, and configured to measure a position of the lens assembly, and a first portion 211 of the first OIS magnet adjacent to the second OIS magnet and a second portion 212 of the second OIS magnet adjacent to the first OIS magnet may have an identical polarity.

In the camera module according to one embodiment, a third portion 213 of the first OIS magnet 135*a* other than the first portion 211 and the fourth portion 214 of the second OIS magnet 135*b* other than the second portion 212 may have an identical polarity.

In the camera module according to one embodiment, the first portion 211 of the first OIS magnet and the second portion 212 of the second OIS magnet may be N poles, and the third portion 213 of the first OIS magnet and the fourth portion 214 of the second OIS magnet may be S poles.

In the camera module according to one embodiment, the first portion of the first OIS magnet and the second portion of the second OIS magnet may be S poles, and the third portion of the first OIS magnet and the fourth portion of the second OIS magnet may be N poles.

In the camera module according to one embodiment, a length ratio of the third portion of the first OIS magnet to the first portion of the first OIS magnet and a length ratio of the fourth portion of the second OIS magnet to the second portion of the second OIS magnet may be equal to each other.

In the camera module according to one embodiment, a length ratio of the third portion of the first OIS magnet to the first portion of the first OIS magnet and a length ratio of the fourth portion of the second OIS magnet to the second portion of the second OIS magnet may be 1:3.

In the camera module according to one embodiment, the first OIS coil member 145*a* may include a first coil 221 facing the first portion 211 of the first OIS magnet, and a third coil 223 facing the third portion 213 of the first OIS magnet, and the second OIS coil member 145*b* may include a second coil 222 facing the second portion 212 of the second OIS magnet, and a fourth coil 224 facing the fourth portion 214 of the second OIS magnet.

The camera module according to one embodiment may further include a driving circuit electrically connected to the first OIS coil member and the second OIS coil member, and the driving circuit may control a current applied to at least one of the first OIS coil member or the second OIS coil member to move the lens assembly on a plane perpendicular to the optical axis.

The camera module according to one embodiment may further include a third OIS magnet 135*c* and a fourth OIS magnet 135*d* fixed to a second side surface of the OIS carrier substantially perpendicular to the first side surface of the OIS carrier, the third OIS magnet and the fourth OIS magnet being arranged side by side on the second side surface along a direction perpendicular to the optical axis, the third OIS magnet and the fourth OIS magnet being polarized magnets, a third OIS coil member 145*c* fixed to the housing to face the third OIS magnet, and a fourth OIS coil member 145*d* fixed to the housing to face the fourth OIS magnet, and a fifth portion 215 of the third OIS magnet adjacent to the fourth OIS magnet and a sixth portion 216 of the fourth OIS magnet adjacent to the third OIS magnet may have an identical polarity.

In the camera module according to one embodiment, a seventh portion 217 of the third OIS magnet other than the fifth portion 215 and an eighth portion 218 of the fourth OIS magnet other than the sixth portion 216 may have an identical polarity.

In the camera module according to one embodiment, the first portion of the first OIS magnet, the second portion of the second OIS magnet, the fifth portion of the third OIS magnet, and the sixth portion of the fourth OIS magnet may have an identical polarity.

In the camera module according to one embodiment, the first portion of the first OIS magnet and the second portion of the second OIS magnet may have a first polarity, and the fifth portion of the third OIS magnet and the sixth portion of the fourth OIS magnet may have a second polarity.

The camera module according to one embodiment may further include a driving circuit electrically connected to the first OIS coil member, the second OIS coil member, the third OIS coil member, and the fourth OIS coil member, and the driving circuit may control a first current applied to at least one of the first OIS coil member or the second OIS coil member to move the lens assembly on a first axis perpendicular to the optical axis and perpendicular to the first side surface, and control a second current applied to at least one of the third OIS coil member or the fourth OIS coil member to move the lens assembly on a second axis perpendicular to the optical axis and perpendicular to the second side surface.

In the camera module according to one embodiment, the position sensor 146*a* may be disposed on the inner side surface of the housing to at least partially overlap a space 139 between the first OIS magnet and the second OIS magnet.

The camera module according to one embodiment may further include an AF carrier 134 configured to accommodate the lens assembly and the OIS carrier and move the lens assembly along the optical axis, an AF magnet fixed to one surface of the outer side surfaces of the AF carrier 136, and an AF coil 149 fixed to the housing to face the AF magnet.

A camera module according to one embodiment may include a lens assembly 110 aligned along an optical axis, an optical image stabilization (OIS) carrier 132 coupled to the lens assembly to move the lens assembly on a plane perpendicular to the optical axis, a housing 140 configured to accommodate the lens assembly and the OIS carrier, a first OIS magnet 135*a* and a second OIS magnet 135*b* fixed to a first side surface of the OIS carrier, the first OIS magnet and the second OIS magnet being arranged side by side on the first side surface along a first axis perpendicular to the optical axis, the first OIS magnet and the second OIS magnet being polarized magnets, the first portion 211 of the first OIS magnet adjacent to the second OIS magnet and a second portion 212 of the second OIS magnet adjacent to the first OIS magnet having a first polarity, an OIS coil member facing the first OIS magnet and the second OIS magnet, a position sensor 146*a* fixed to the housing to be adjacent to the OIS coil member, and a driving circuit electrically connected to the OIS coil member and the position sensor, and the driving circuit may control a current applied to the OIS coil member to move the lens assembly on a plane perpendicular to the optical axis, and may measure a position of the lens assembly by using the position sensor.

In the camera module according to one embodiment, a third portion 213 of the first OIS magnet other than the first portion 211 and a fourth portion 214 of the second OIS magnet other than the second portion 212 may have a second polarity.

In the camera module according to one embodiment, a length ratio of the third portion to the first portion on the first axis may correspond to a length ratio of the fourth portion to the second portion on the first axis.

In the camera module according to one embodiment, the OIS coil member may include a first coil 221 facing the first portion of the first OIS magnet, a second coil 222 facing the second portion of the second OIS magnet, a third coil 223 facing the third portion of the first OIS magnet, and a fourth coil 224 facing the fourth portion of the second OIS magnet.

In the camera module according to one embodiment, the OIS coil member may be a fine pattern (FP) coil including patterns corresponding to the first coil, the second coil, the third coil, and the fourth coil, respectively.

The invention claimed is:

1. A camera module comprising:
   a lens assembly aligned along an optical axis thereof;
   an optical image stabilization (OIS) carrier coupled to the lens assembly to move the lens assembly on a plane perpendicular to the optical axis;
   a housing configured to accommodate the lens assembly and the OIS carrier;
   a first OIS magnet and a second OIS magnet fixed to a first side surface of the OIS carrier, the first OIS magnet and the second OIS magnet being arranged side by side on the first side surface along a direction perpendicular to the optical axis, the first OIS magnet and the second OIS magnet being polarized magnets;
   a first OIS coil member fixed to the housing to face the first OIS magnet;
   a second OIS coil member fixed to the housing to face the second OIS magnet; and
   a position sensor fixed to the housing while being disposed between the first OIS coil member and the second OIS coil member, and configured to measure a position of the lens assembly,
   wherein a first portion of the first OIS magnet adjacent to the second OIS magnet and a second portion of the second OIS magnet adjacent to the first OIS magnet have an identical polarity,
   wherein the first OIS magnet comprises a third portion other than the first portion, and
   a length of the third portion of the first OIS magnet differs from a length of the first portion of the first OIS magnet.

2. The camera module of claim 1, wherein the third portion of the first OIS magnet, and a fourth portion of the second OIS magnet other than the second portion have an identical polarity.

3. The camera module of claim 2, wherein the first portion of the first OIS magnet and the second portion of the second OIS magnet are N poles, and
   the third portion of the first OIS magnet and the fourth portion of the second OIS magnet are S poles.

4. The camera module of claim 2, wherein the first portion of the first OIS magnet and the second portion of the second OIS magnet are S poles, and
   the third portion of the first OIS magnet and the fourth portion of the second OIS magnet are N poles.

5. The camera module of claim 2, wherein a length ratio of the third portion of the first OIS magnet to the first portion of the first OIS magnet and a length ratio of the fourth portion of the second OIS magnet to the second portion of the second OIS magnet are equal to each other.

6. The camera module of claim 5, wherein the length ratio of the third portion of the first OIS magnet to the first portion of the first OIS magnet and the length ratio of the fourth portion of the second OIS magnet to the second portion of the second OIS magnet are 1:3.

7. The camera module of claim 2, wherein the first OIS coil member comprises a first coil facing the first portion of the first OIS magnet, and a third coil facing the third portion of the first OIS magnet, and
   the second OIS coil member comprises a second coil facing the second portion of the second OIS magnet, and a fourth coil facing the fourth portion of the second OIS magnet.

8. The camera module of claim 1, further comprising a driving circuit electrically connected to the first OIS coil member and the second OIS coil member,
   wherein the driving circuit controls a current applied to at least one of the first OIS coil member or the second OIS coil member to move the lens assembly on a plane perpendicular to the optical axis.

9. The camera module of claim 1, further comprising:
   a third OIS magnet and a fourth OIS magnet fixed to a second side surface of the OIS carrier substantially perpendicular to the first side surface of the OIS carrier, the third OIS magnet and the fourth OIS magnet being arranged side by side on the second side surface along a direction perpendicular to the optical axis, the third OIS magnet and the fourth OIS magnet being polarized magnets;
   a third OIS coil member fixed to the housing to face the third OIS magnet; and
   a fourth OIS coil member fixed to the housing to face the fourth OIS magnet,
   wherein a fifth portion of the third OIS magnet adjacent to the fourth OIS magnet and a sixth portion of the fourth OIS magnet adjacent to the third OIS magnet have an identical polarity.

10. The camera module of claim 9, wherein a seventh portion of the third OIS magnet other than the fifth portion and an eighth portion of the fourth OIS magnet other than the sixth portion have an identical polarity.

11. The camera module of claim 10, wherein the first portion of the first OIS magnet, the second portion of the second OIS magnet, the fifth portion of the third OIS magnet, and the sixth portion of the fourth OIS magnet have an identical polarity.

12. The camera module of claim 10, wherein the first portion of the first OIS magnet and the second portion of the second OIS magnet have a first polarity, and
   the fifth portion of the third OIS magnet and the sixth portion of the fourth OIS magnet have a second polarity.

13. The camera module of claim 9, further comprising a driving circuit electrically connected to the first OIS coil member, the second OIS coil member, the third OIS coil member, and the fourth OIS coil member,
   wherein the driving circuit:
   controls a first current applied to at least one of the first OIS coil member or the second OIS coil member to move the lens assembly on a first axis perpendicular to the optical axis and perpendicular to the first side surface, and
   controls a second current applied to at least one of the third OIS coil member or the fourth OIS coil member to move the lens assembly on a second axis perpendicular to the optical axis and perpendicular to the second side surface.

14. The camera module of claim 1, wherein the position sensor is disposed on an inner side surface of the housing to at least partially overlap a space between the first OIS magnet and the second OIS magnet.

15. The camera module of claim 1, further comprising:
an AF carrier configured to accommodate the lens assembly and the OIS carrier and move the lens assembly along the optical axis;
an AF magnet fixed to one surface of among outer side surfaces of the AF carrier; and
an AF coil fixed to the housing to face the AF magnet.

16. A camera module comprising:
a lens assembly aligned along an optical axis thereof;
an optical image stabilization (OIS) carrier coupled to the lens assembly to move the lens assembly on a plane perpendicular to the optical axis;
a housing configured to accommodate the lens assembly and the OIS carrier;
a first OIS magnet and a second OIS magnet fixed to a first side surface of the OIS carrier, the first OIS magnet and the second OIS magnet being arranged side by side on the first side surface along a first axis perpendicular to the optical axis, the first OIS magnet and the second OIS magnet being polarized magnets, a first portion of the first OIS magnet adjacent to the second OIS magnet and a second portion of the second OIS magnet adjacent to the first OIS magnet having a first polarity;
an OIS coil member facing the first OIS magnet and the second OIS magnet;
a position sensor fixed to the housing to be adjacent to the OIS coil member; and
a driving circuit electrically connected to the OIS coil member and the position sensor,
wherein the driving circuit:
controls a current applied to the OIS coil member to move the lens assembly on the plane perpendicular to the optical axis; and
measures a position of the lens assembly by using the position sensor,
wherein the first OIS magnet comprises a third portion other than the first portion, and
a length of the third portion of the first OIS magnet differs from a length of the first portion of the first OIS magnet.

17. The camera module of claim 16, wherein the third portion of the first OIS magnet and a fourth portion of the second OIS magnet other than the second portion have a second polarity.

18. The camera module of claim 17, wherein a length ratio of the third portion to the first portion on the first axis corresponds to a length ratio of the fourth portion to the second portion on the first axis.

19. The camera module of claim 17, wherein the OIS coil member comprises a first coil facing the first portion of the first OIS magnet, a second coil facing the second portion of the second OIS magnet, a third coil facing the third portion of the first OIS magnet, and a fourth coil facing the fourth portion of the second OIS magnet.

20. The camera module of claim 19, wherein the OIS coil member is a fine pattern (FP) coil comprising patterns corresponding to the first coil, the second coil, the third coil, and the fourth coil, respectively.

* * * * *